(12) United States Patent
Kim et al.

(10) Patent No.: US 6,564,238 B1
(45) Date of Patent: May 13, 2003

(54) DATA PROCESSING APPARATUS AND METHOD FOR PERFORMING DIFFERENT WORD-LENGTH ARITHMETIC OPERATIONS

(75) Inventors: Hong-Kyu Kim, Kyunggi-do (KR); Yong-Chun Kim, Kyunggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/497,063

(22) Filed: Feb. 2, 2000

(30) Foreign Application Priority Data

Oct. 11, 1999 (KR) .............................. 99-43861

(51) Int. Cl.[7] .................................................. G06F 7/38
(52) U.S. Cl. ........................................ 708/513; 708/490
(58) Field of Search ................................ 708/209, 518, 708/523, 493, 530, 603, 625

(56) References Cited

U.S. PATENT DOCUMENTS

| | | | |
|---|---|---|---|
| 4,785,393 A | * 11/1988 | Chu et al. ............... | 708/231 |
| 5,155,820 A | * 10/1992 | Gibson ...................... | 712/210 |
| 5,253,195 A | * 10/1993 | Broker et al. ............. | 708/627 |
| 5,436,860 A | * 7/1995 | Shankar et al. ............ | 708/603 |
| 5,598,362 A |   1/1997 | Adelman et al. | |
| 5,666,300 A | * 9/1997 | Adelman et al. .......... | 708/521 |
| 5,787,025 A | * 7/1998 | Muwafi et al. ............ | 708/490 |
| 5,796,645 A | * 8/1998 | Peh et al. .................. | 708/603 |
| 6,209,012 B1 | * 3/2001 | Baudendistel ............ | 708/209 |

* cited by examiner

Primary Examiner—Chuong Dinh Ngo
Assistant Examiner—Chat C. Do
(74) Attorney, Agent, or Firm—F. Chau & Associates, LLP (57) ABSTRACT

A digital signal processing system performs different word-length arithmetic operations (e.g., 24-bit arithmetic and 16-bit arithmetic) using the same hardware. The digital signal processing system includes internal buses, a host processor coupled to the internal buses, a DSP coprocessor coupled to the internal buses for performing a digital signal processing under control of the host processor, and first and second data memories coupled to the internal buses. The DSP coprocessor further includes a random access memory (RAM) pointer for generating addresses to access the first and second data memories, a multiply and accumulate (MAC) unit for performing a multiply and accumulate operation, an arithmetic unit, a shift and exponent unit for shifting operands and for evaluating exponents, and a local decoder for decoding DSP commands from the host processor and controlling the RAM pointer, the arithmetic unit, and the shift and exponent unit.

14 Claims, 8 Drawing Sheets

DATA PROCESSING APPARATUS AND METHOD FOR PERFORMING DIFFERENT WORD-LENGTH ARITHMETIC OPERATIONS

FIELD OF THE INVENTION

The present invention generally relates to a data processing system and, more particularly, to a pipelined data processing apparatus and method for performing different word-length arithmetic operations.

BACKGROUND OF THE INVENTION

Recent communications and multimedia products, such as portable phones, personal digital assistants (PDAs), ATM switches, game machines, digital audio players, digital video players, and personal computers, require a large amount of data throughput. Many of such products are equipped with some form of digital signal processing capability. In digital signal processing involving filtration, mix, and comparison of signals, for example, Fourier transforms, finite impulse response filtering, and infinite impulse response filtering, it may be more advantageous that such processing operation be performed using hardware.

Many electronic products with the digital signal processing capability have a host processor chip, such as a microprocessor or microcontroller, for overall control and I/O operations and a separate digital signal processor (DSP) chip for particular digital signal processing functions as a coprocessor of the host processor.

A basic operation of DSPs is a multiply and accumulate (MAC) operation. A MAC unit multiplies two binary numbers and accumulates (i.e., adds) the result of the multiplication with a third binary number.

DSPs may be designed for use in various application-specific systems, for example, video signal processing for image, speech signal processing for voice, audio signal processing for sound, and the like.

Video signals are normally manipulated with 8 bits. High speed DSPs are necessary for processing video signals because a relatively high capability of mathematical computations is required for the video signal processing. Thus, presently, there is a trend toward vector processors in which several operations are performed simultaneously, rather than scalar processors in which only one operation is executed at a time.

Signal processing involving speech requires more arithmetic operations, and thus more accuracy and precision are needed than does the video signal processing. The speech signal processing processes human voice signals. Most speech signals are processed with 16 bits. For example, the GSM cellular communication standards in Europe require exactly 16 bits of precision, so that 16-bit DSPs may be used in the GSM cellular communication environment.

Recent multimedia applications for high fidelity sound may require more bits for providing a higher degree of accuracy than that required for voice. In the audio signal processing, floating-point DSPs are preferred to fixed-point processors, but in the case of using fixed-point DSPs, 24-bit processors are most commonly used. An example of 24-bit fixed-point DSPs is the Motorola DSP56300 family.

In the event that a 16-bit voice signal is processed in a 24-bit fixed-point DSP being dedicated to processing sound signals, it is necessary to expand the 16-bit voice signal to a 24-bit format. This requires a considerable amount of additional memory capacity, thereby increasing cost. In addition, even though a very small portion of an entire signal processing algorithm processes the sound signal, all the data handled with the algorithm must be converted into the 24-bit format. Furthermore, existing firmware for processing the voice signal is needed to be converted into the 24-bit format. An approach to overcome the above problems is found in U.S. Pat. No. 5,598,362, issued to Adelman et al., on Jan. 28, 1997. According to Adelman et al., a DSP performs both 24-bit arithmetic and 16-bit arithmetic using the same hardware. For a MAC operation in 16-bit mode, shifting operations are used to align operands.

However, in a 16-bit MAC operation of a conventional DSP, additional data alignments are performed four times (once for memory-read and multiply, three times for accumulate and memory-write) or more because a conventional DSP requires a data alignment for every register access operation, such as accumulation, barrel shifting, and bit-field operation, and every memory access operation. This causes problems such as a decrease in computation speed and an increase in power consumption.

Therefore, a need exists for a data processing system for performing arithmetic operations in different word lengths using the same hardware.

SUMMARY OF THE INVENTION

It is an object of the present invention to provide a low-power, low-cost, high-performance data processing system suitable for multimedia applications.

It is another object of the present invention to provide an improved host processor-coprocessor system-on-a-chip (SOC) having a pipelined mode of operation.

It is yet another object of the present invention to provide an apparatus for performing different word-length arithmetic operations in a data processing system, using the same hardware.

It is yet another object of the present invention to provide a method for performing a data alignment required during performing different word-length arithmetic operations in a data processing system using the same hardware.

These and other objects, features and advantages of the present invention are provided by a digital signal processor (DSP) which includes a first M-bit register, a second M-bit register, a first shifter, a second shifter, a 2M-bit register, a first execution unit, an extension unit, and a second execution unit, where M is an integer.

According to a preferred aspect of the invention, the first M-bit register stores a first N-bit operand, where N is integers and N is less than M. The second M-bit register stores a second N-bit operand. The first shifter shifts the first N-bit operand to the left. The second shifter shifts the second N-bit operand to the left. The first execution unit performs a first arithmetic operation on the first and second N-bit operands to obtain a 2N-bit result. The 2M-bit register stores the 2N-bit result. The N high-order bits of the 2N-bit result are stored in the N least significant bits of M high-order bits of the 2M-bit register and the N low-order bits of the 2N-bit result are stored in the N most significant bits of M low-order bits of the 2M-bit register. The extension unit extends a content of the 2M-bit register to P bits, where P is an integer and P is larger than the 2N. The second execution unit performs a second arithmetic operation on the extended P bits and a third operand to obtain a P-bit result.

The DSP has an M-bit (e.g., 24-bit) operating mode and an N-bit (e.g., 16-bit) operating mode. A conversion between the M-bit operating mode and the N-bit operating mode is performed in response to one of a mode conversion command and a change of status data in a status register.

The DSP further includes a P-bit register that stores the P-bit result. The P-bit register includes (P-2M) guard bits for preventing overflow and underflow in the 24-bit operating mode. The DSP further includes a status register for storing status data, such as sign, carry, overflow, underflow, zero and other flags, and a second P-bit register for storing the P-bit result. The status register includes (P-2M) guard bits for preventing overflow and underflow in the 24-bit operating mode. The second P-bit register includes (P-2M) guard bits for preventing overflow and underflow in the 16-bit operating mode.

According to another preferred aspect of the invention, a data processing system comprises internal buses, a host processor, a DSP coprocessor, and a first and second data memories. The DSP coprocessor comprises a RAM pointer for generating addresses to access the first and second data memories, a MAC unit for performing a multiply and accumulate operation, an arithmetic unit for performing addition, subtraction, comparison, increment, decrement, and bit-field manipulation operations, a shift and exponent unit for shifting operands and for evaluating exponents, and a local decoder for decoding DSP commands from the host processor and controlling the RAM pointer, the arithmetic unit, and the shift and exponent unit. The host processor is a K-bit processor and the DSP coprocessor is a 3K-bit processor, where K is an integer. The first data memory is divided into a first and second memory blocks which are identical with each other in memory capacity and store 2K-bit wide data. The second data memory is divided into a third and fourth memory blocks which are identical with each other in memory capacity and store the 2K-bit wide data. The first and third memory blocks have odd addresses and the second and third memory blocks have even addresses. The first and second data memory includes a first and second shadow memory blocks which are used to store 3K-bit wide data and have even addresses.

According another preferred aspect of the invention, a method for performing a multiply and accumulate operation in a M-bit data processing system is provided. The method includes allowing the M-bit data processing system to enter one of an M-bit operating mode and an N-bit operating mode in response to a mode conversion command, where M and N are integers, and M is larger than N; providing a first N-bit operand to a first M-bit register in the N-bit operating mode; providing a second N-bit operand to a second M-bit register in the N-bit operating mode; shifting the first N-bit operand; shifting the second N-bit operand; performing a first arithmetic operation on the first and second N-bit operands to obtain a 2N-bit result; and storing the 2N-bit result. The N high-order bits of the 2N-bit result are aligned in N least significant bits of M high-order bits of the 2M-bit register and the N low-order bits of the 2N-bit result are aligned in N most significant bits of M low-order bits of the 2M-bit register. The method further includes extending a content of the 2M-bit register to P bits, where P is an integer and P is larger than the 2N after the storing the 2N-bit result; and performing a second arithmetic operation on the extended P bits and a third operand to obtain a P-bit result. The performing a first arithmetic operation includes multiplying the first and second N-bit operands, and the performing a second arithmetic operation includes adding the extended P-bits and the third operand to obtain the P-bit result. The M may be equal to 24 and the N may be equal to 16. The method further includes performing mode conversions between the M-bit operating mode and the N-bit operating mode in response to one of a mode conversion command and a change of status data.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The present invention will be described in detail hereinafter with reference to the accompanying drawings. In the following description, specific details are set forth to provide a more thorough understanding of the invention. However, the invention may be practiced without these particulars. In some instances, well known elements are not shown or described to avoid unnecessarily obscuring the present invention. Accordingly, the specification and drawings of the present invention should be regarded as illustrative, rather than restrictive.

A novel M-bit digital signal processor according to the invention, where, M is an integer, is characterized by performing different word-length arithmetic operations, e.g., 24-bit and 16-bit arithmetic operations, using the same hardware. In the digital signal process of the present invention, a multiply and accumulate (MAC) unit aligns data once for an N-bit multiplication, where N is an integer and is smaller than M, and aligns data once in an N-bit data read or write operation of an accumulator register.

Recently, System-On-a-Chip (SOC) type chip design techniques are drawing great attention of chip designers, particularly application-specific integrated circuit (ASIC) designers, because such design techniques can save cost, power consumption, and system design complexity, and improve system reliability as compared to other chip designs requiring two or more separate processor chips or cores. Compared with the separate-chip or -core approaches, the SOC approaches can achieve more efficient communications between a host processor and its coprocessor(s). For example, by equipping a host microprocessor with digital signal processor (DSP) instructions and interface scheme, control functions and DSP functions can be implemented on a single processor chip. The SOC approaches also have other advantages over the separate-chip or core approaches such that coprocessor programs can be written easily by using coprocessor instructions of a host processor, and hardware cost can be reduced because there is no hardware duplication. Thus, the SOC techniques are used in the present invention.

Figure 1:
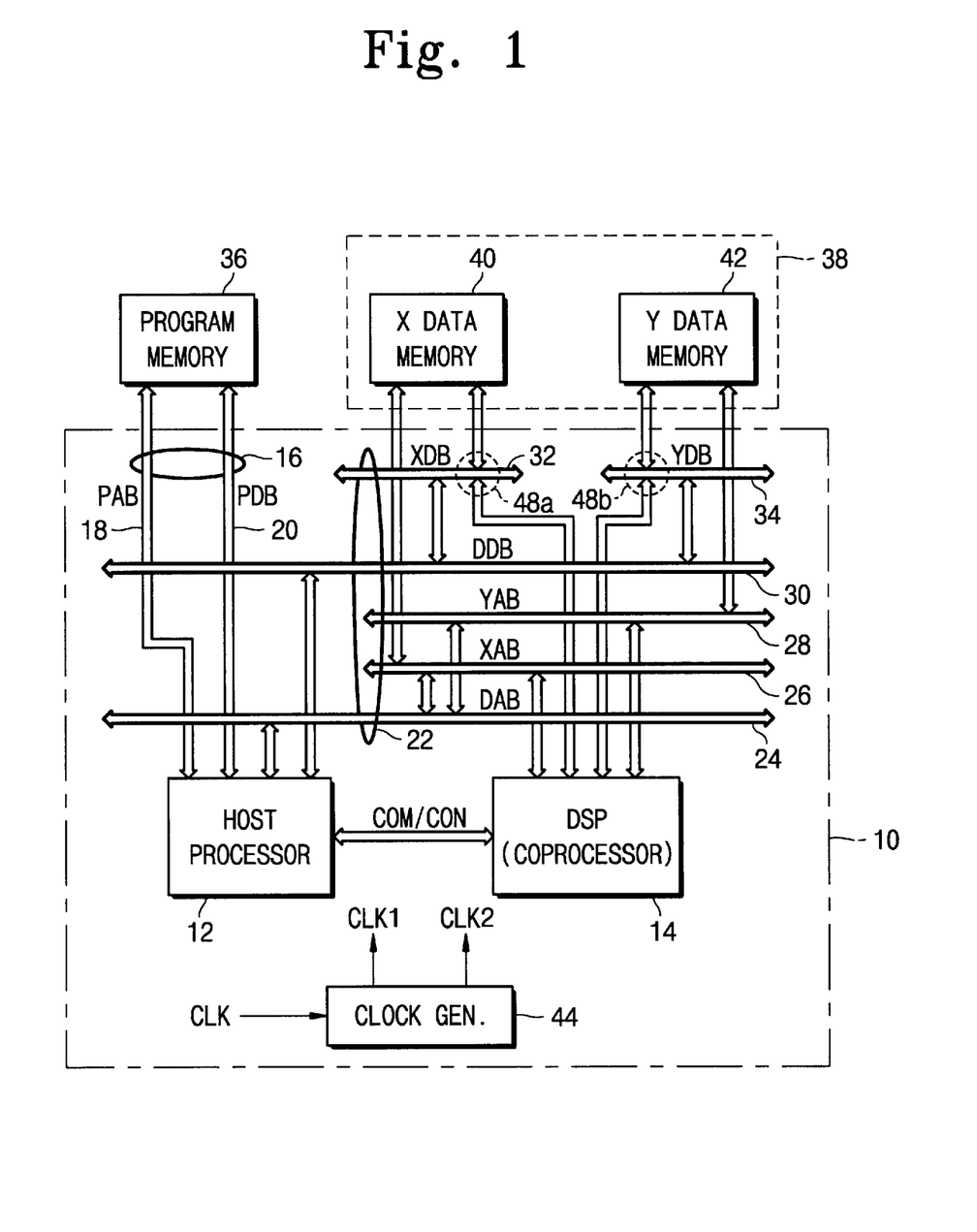
FIG. 1 is a block diagram illustrating a preferred embodiment of a system-on-a-chip (SOC) type host-coprocessor data processing system according to the present invention.

FIG. 1 illustrates a preferred embodiment of a digital signal processing system according to the present invention in a block diagram form. Referring to FIG. 1, an SOC type of a pipelined host-coprocessor system 10 comprises a pipelined host processor 12, such as a general purpose microcontroller or microprocessor, and a pipelined fixed-point digital signal processor (DSP) 14 as a coprocessor. The host processor 12 performs normal control functions, and the DSP 14 performs additional specific digital signal processing functions, such as filtration, mix, and comparison of signals.

The host-coprocessor system 10 is also provided with program memory 36, such as a mask ROM (read-only memory), a PROM (programmable ROM), an EPROM (erasable and programmable ROM), an EEPROM (electrically erasable and programmable ROM) or a flash EEPROM, and a data memory 38, such as a dynamic random access memory (DRAM) or a static RAM (SRAM). The program and data memories 36 and 38 store instructions and data items, respectively. The data memory 38 has two memories, X data memory 40 and Y data memory 42, which will be described in detail later. The program memory 36 and the data memory 38 may be incorporated within the system 10.

The host-coprocessor system 10 has an efficient and powerful interface between the host processor 12 (or microprocessor) and the DSP 14, and may also have a reduced instruction set computer (RISC) system architecture with low power consumption. The host processor 12 has a set of generic DSP instructions on its instruction map and a set of core pin signals for performing interfaces with the DSP 14. The generic DSP instructions are renamed to specific DSP commands according to the interfaces of the host processor 12 with the DSP 14. When a DSP instruction is fetched and predecoded by the host processor 12, the host processor 12 issues appropriate commands via DSP interface signals to the DSP 14, and the DSP 14 performs tasks designated by the appropriate commands. Hence, the DSP 14 interfacing with the host processor 12 is passive in a sense that the DSP 14 does not have its own program memory. Pipeline mode operations of the DSP 14 are synchronized with those of the host processor 12 in a specific manner. The synchronization can prevent the host processor 12 and the DSP 14 from conflicting with each other in the accesses to resources, such as data memory 38.

The host-coprocessor system 10 also includes program memory buses 16 and data memory buses 22. The program memory buses 16 include an address bus 18 labeled PAB and a data bus 20 labeled PDB, which are connected between the host processor 12 and the program memory 36. The data memory buses 22 include address buses 24, 26 and 28 labeled DAB, XAB and YAB, respectively, and data buses 30, 32 and 34 labeled DDB, XDB and YDB, respectively. The host processor 12 is connected to the address bus 22 and the data bus 30. The DSP 14 is connected to the address buses 26 and 28, and the data buses 32 and 34. The X and Y data memories 40 and 42 are connected to the address buses 26 and 28, respectively, and they are also connected to the data buses 32 and 34, respectively. The address bus 24 may be selectively connected to the address buses 26 and 28. Similarly, the data bus 30 may be selectively connected to the data buses 32 and 34. The host processor 12 and the DSP 14 access to the same data memory 38.

Figure 2:
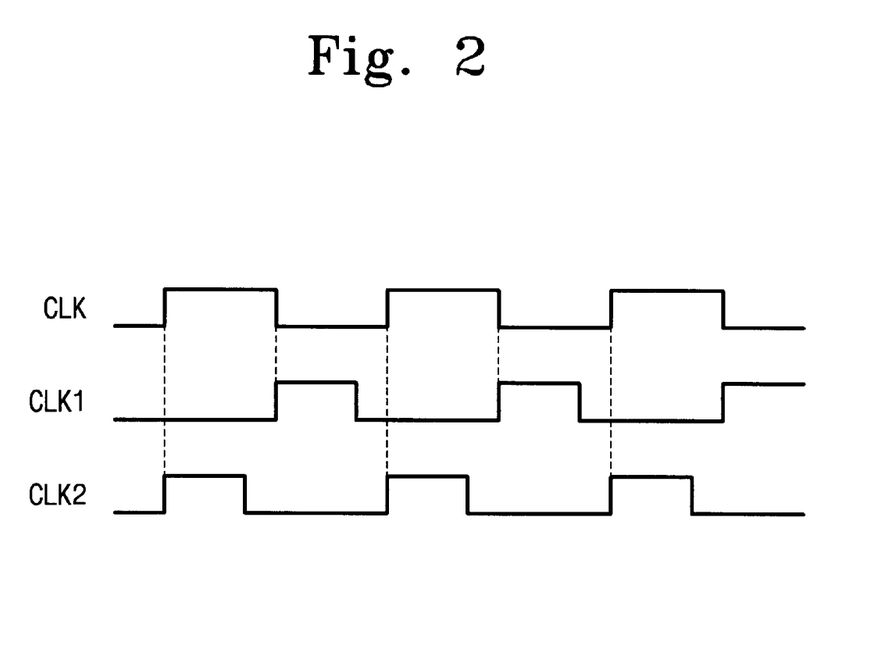
FIG. 2 is a timing diagram illustrating an external clock signal and internal clock signals used in the data processing system of FIG. 1.

The host-coprocessor system 10 further includes an internal clock generation circuit 44 which receives an externally applied clock signal (a so-called master clock) CLK and generates two internal clock signals CLK1 and CLK2 synchronized with the external clock signal CLK. A timing diagram illustrating the external and internal clock signals is shown in FIG. 2. The host-coprocessor system 10 further includes two bus data aligners 48a and 48b to align bit positions of data on the data buses 32 and 34, respectively, in response to operations of the host processor 12 or the DSP 14.

Here, assuming that the host processor 12 is an 8-bit ultra-low power embedded microprocessor that adopts a register-memory Harvard RISC architecture, the host processor 12 processes information by 8 bits (1 byte) and requires an 8-bit wide data bus 20 (labeled PDB) or 30 (labeled DDB). The host processor 12 also has separate program memory space and data memory address space since the host processor 12 adopts the Harvard architecture. For the purpose of explanation only, it is also assumed that maximum address space of the program memory 36 is 1 M words, and maximum address space of the data memory 38 is 64-Kbyte. In this case, a 20-bit program memory address bus is needed to access the program memory 36 and a 16-bit data memory address bus is needed to access the data memory 38. The 64-Kbyte data memory 38 is partitioned into two 32-Kbyte parts: X and Y data memories (or memory banks) 40 and 42. The partition of the data memory 38 will be described in detail later. Each of the two data memories 40 and 42 may additionally include a shadow memory block that is 16-Kbyte or below, so that actual capacity of the data memory 38 is in the range of 64 Kbytes to 96 Kbytes. Shadow memory blocks in the data memory 38 will be described in detail referring to FIG. 9.

The host processor 12 further includes conventional processor components, such as general-purpose registers, special-purpose registers, and hardware stacks, which are not shown in FIG. 1.

The DSP 14 is a 24-bit fixed-point processor which is applicable to cost-sensitive multimedia digital signal processing applications. The DSP 14 processes information by 24 bits (1 bytes) and has 24-bit wide data buses 32 and 34 labeled XDB and YDB, respectively.

The host processor 12 is pipelined and has 3 stages: IF (Instruction Fetch), ID/MEM (Instruction Decode and Data Memory Access), and EX (Execution) stages. In contrast, the DSP 14 is pipelined and has only 2 stages: MEM (Instruction Decode and Data Memory Access) and EXE (Execution) stages. The host processor 12 fetches a DSP instruction, and issues appropriate commands via DSP interface signals to the DSP 14. Then, the DSP 14 performs tasks designated by the appropriate commands from the host processor 12. As a result, the DSP 14 needs no instruction fetch cycle. The MEM and EXE stages of the DSP 14 correspond to the ID/MEM and EX stages of the host processor 12, respectively, and the MEM and EXE stages of the DSP 14 have the same timing as the ID/MEM and EX stages of the host processor 12, respectively.

Figure 3:
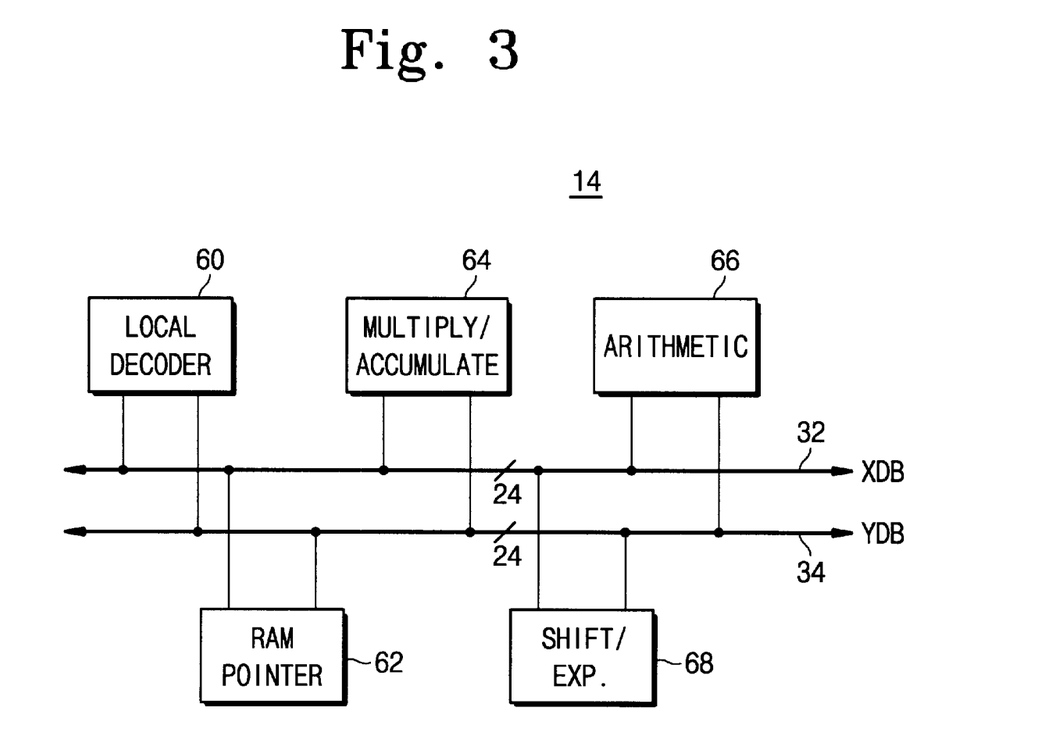
FIG. 3 is a block diagram illustrating an embodiment of the digital signal processor of the data processing system shown in FIG. 1.

FIG. 3 illustrates an embodiment of the DSP coprocessor 14 of the data processing system 10 shown in FIG. 1. Referring to FIG. 3, the DSP 14 includes a local decoder 60, a RAM pointer 62, a multiply and accumulate (MAC) unit 64, an arithmetic unit 66, and a shift and exponent (SE) unit 68. The local decoders 60, RAM pointer 62, MAC unit 64, arithmetic unit 66, and SE unit 68 are commonly connected to the 24-bit data buses 32 and 34. Among the above circuit components of the DSP 14, the MAC unit 64 and the arithmetic unit 66 is configured to process 24-bit data, such as audio data, but the other components are configured to process 16-bit data, such as speech data for cellular communication standards.

The local decoder 60 decodes DSP commands provided from the host processor 12 and controls RAM pointer 62, MAC unit 64, and SE unit 68 in accordance with the decoding result. The RAM pointer 62 generates addresses necessary for accessing the data memory 38.

The DSP 14 performs a MAC operation in which two data operands are fetched simultaneously in a single cycle. Thus, the data memory 38 is preferably partitioned into two parts: X and Y memories 40 and 42, and the RAM pointer 62 preferably generates two addresses (i.e., X address and Y address) simultaneously in a single cycle.

Figure 4:
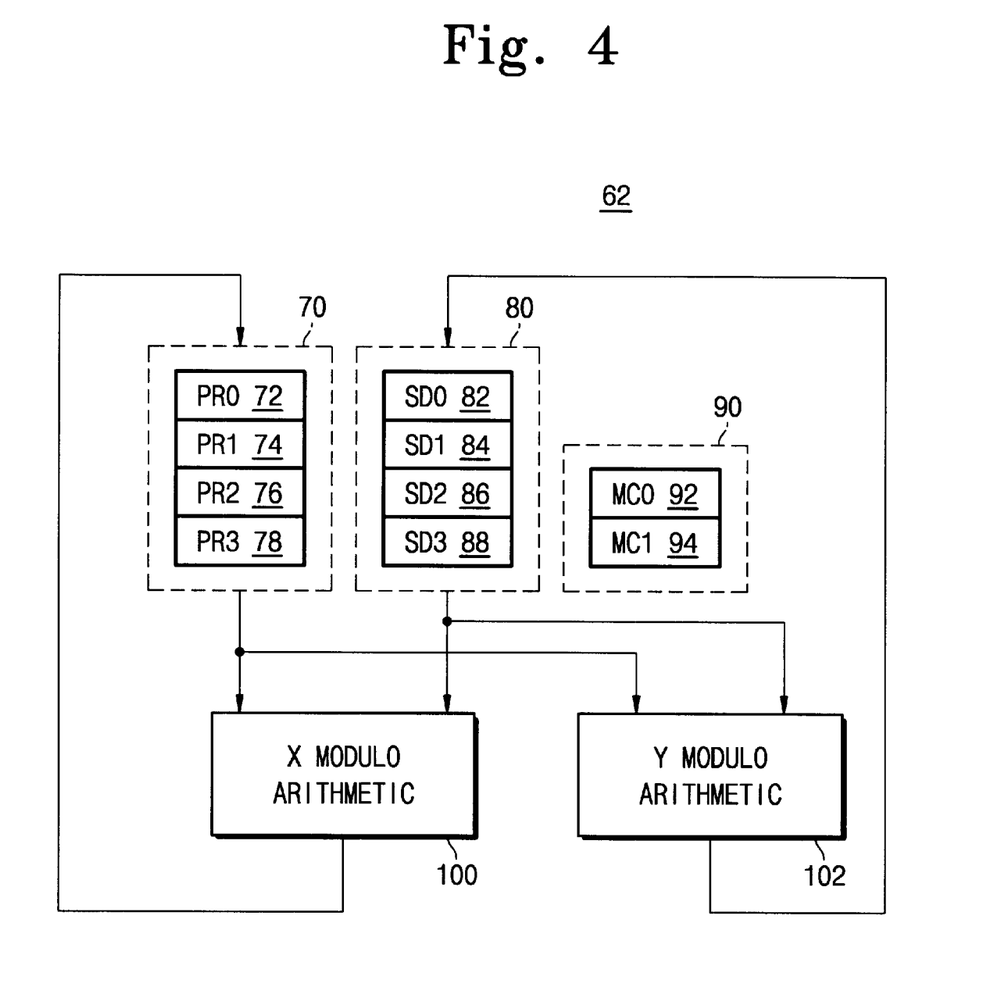
FIG. 4 is a block diagram illustrating an embodiment of the random access memory (RAM) pointer shown in FIG. 3.

FIG. 4 is a block diagram illustrating an embodiment of the RAM pointer 62 shown in FIG. 3. The RAM pointer 62 is configured to provide a modulo addressing. Referring to FIG. 4, the RAM pointer 62 includes a pointer register file 70 including four 16-bit pointer registers 72, 74, 76 and 78 (labeled PR0, PR1, PR2 and PR3, respectively), an index register file 80 including four 16-bit index registers 82, 84, 86 and 88 (labeled SD0, SD1, SD2 and SD3, respectively), a control register file 90 including two control registers 92 and 94 (labeled MC0 and MC1, respectively), and two modulo arithmetic units, X modulo arithmetic unit 100 and Y modulo arithmetic unit 102. The X and Y modulo arithmetic units 100 and 102 accomplish modulo calculations for generating an X memory address and a Y memory address simultaneously in a MAC operation. The DSP 14 accesses the X and Y data memories 40 and 42 through the RAM pointer 62.

Returning to FIG. 3, the MAC unit 64 performs 24-bit× 24-bit multiply operations and accumulates results of the multiply operations. Even though a result of a multiply operation is 48-bit, a result of an accumulate operation is represented by a 52-bit fixed-point format in order that the result of the accumulate operation would not overflow. The MAC unit 64 provides a complete solution for both 24-bit and 16-bit arithmetic operations. That is, all instructions can be executed in 24-bit operating mode or 16-bit operating mode, including multi-precision arithmetic. The same instructions and hardware are used in both the modes. The MAC unit 64 will be described in detail referring FIGS. 5 and 6.

Figure 5:
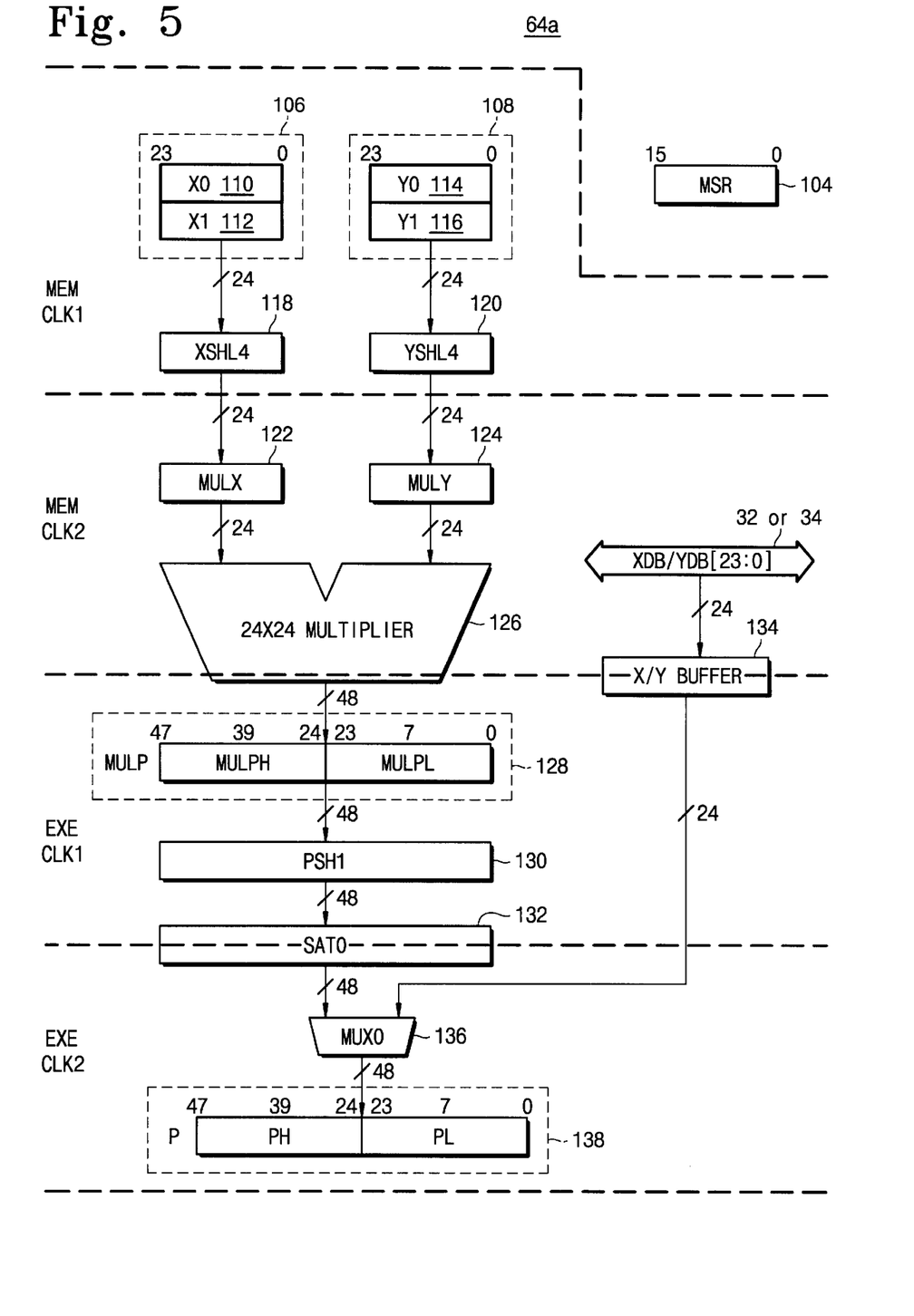
FIG. 5 is a block diagram illustrating a multiplier portion of the multiply and accumulate unit shown in FIG. 3.

FIG. 5 illustrates a multiplier circuit portion 64a of the MAC unit 64 of FIG. 3 in block form. The multiplier circuit portion 64a of the MAC unit 64 (hereinafter, referred to as "M-MAC") performs both 24-bit arithmetic and 24-bit logical operations and 16-bit arithmetic and 16-bit logical operations using the same hardware. Shifting operations are performed on operands of the operations to allow the 16-bit arithmetic and 16-bit logical operations. The M-MAC unit 64a is pipelined, and each multiply is performed in two external clock cycles (i.e., four internal clock cycles). In the first external clock cycle, a result of the multiply operation is obtained. In the second external clock cycle, the result of the multiply operation is stored in a register.

The M-MAC unit 64a includes a status register 104, X input register circuit 106, Y input register circuit 108, and X and Y shifters 118 and 120 connected to the X and Y input register circuits 106 and 108, respectively. The status register 104 is, for example, 16-bit. The X input register circuit 106 has two 24-bit registers 110 and 112 labeled X0 and X1, respectively. The Y input register circuit 108 also has two 24-bit registers 114 and 116 labeled Y0 and Y1, respectively. Operations of the registers 110, 112, 114 and 116, and the sifters 118 and 120 are synchronized with the first internal clock signal CLK1 (see FIG. 2) in the MEM stage of pipeline. A conversion between the 24-bit operating mode and the 16-bit operating mode is performed either in response to a mode conversion command provided from external via the host processor 12 or by changing a status bit in the status register 104.

A first 24- or 16-bit operand is stored in one of the X input registers 110 and 112. A second 24- or 16-bit operand is stored in one of the Y input registers 114 and 116. The first and second operands may be provided from X data memory 40 and Y data memory 42 (or, Y data memory 42 and X data memory 40), respectively (see FIG. 1). In the 16-bit operating mode, the first and second 16-bit operands are stored in the 16 least significant bits of the input registers (e.g., the registers 112 and 114), and zeros are stored in the 8 most significant bits of the respective input registers 112 and 114.

When the first and second operands are 24-bit, the operands are transferred through the X and Y shifters 118 and 120 into registers 122 and 124, respectively, without shifting. But, if the first and second operands are 16-bit, then the first and second 16-bit operands are shifted by 4 bits to the left by the shifters 118 and 120, respectively. The 4 most significant bits and the 4 least significant bits of the shifters 118 and 120 are written with zeros. The shifted results of the shifters 118 and 120 are provided to the registers 122 and 124, respectively. The first and second 24- or 16-bit operands are multiplied together in a 24×24 multiplier 126. A 48-bit product is obtained in the 24×24 bit multiply operation, and a 32-bit product is obtained in the 16×16 bit multiply operation. The registers 122, 124 and the multiplier 126 are synchronized with the second internal clock signal CLK2 (see FIG. 2) in the MEM stage of pipeline.

The M-MAC unit 64a further includes a 48-bit temporary register 128 labeled MULP, a shifter 130 labeled PSH1, a saturation register 132 labeled SAT0, a multiplexer 136 labeled MUX0, and a product register 138 labeled P. The registers 128, 130, and 132 are synchronized with the first internal clock signal CLK1 in the EXE stage of pipeline, and the multiplexer 136 and the product registers 138 are synchronized with the second internal clock signal CLK2 and their functions are executed in the EXE stage of pipeline.

A 48-bit product of the multiplier 126 is stored in the temporary register 128. Particularly, in the 16-bit operating mode, a 32-bit product of the multiplier 126 is transferred into bits 39 to 8 of the register 128; that is, 16 high-order bits of the 32-bit product are stored in the 16 least significant bits of 24 high-order bits MULPH of the register 128, and 16 low-order bits of the 32-bit product are stored in the 16 most significant bits of the low-order bit position MULPL of the register 128. A content of the temporary register 128 is provided to the shifter 130. This shifter 130 corrects the position of binary point of a binary fraction product. For example, when two 24-bit fixed-point binary fractions of a so-called "1.23 format" (i.e., one integer bit and twenty-three fraction bits) are multiplied together, a result of a so-call "2.46 format" (i.e., two integer bits and forty-six fraction bits) is obtained. In this case, the 1-bit shifter 130 converts the "2.46 format" into a so-called "1.47 format" (i.e., one integer bit and forty-seven fraction bits) of fixed-point representation. When the status register 104 denotes a multiplication of two fixed-point numbers, the shifter 130 shifts a result of the multiplication to the left by 1 bit.

When an overflow or underflow occurs, the saturation register 132 performs a 48-bit saturation operation in 24-bit operating mode or a 32-bit saturation operation in 16-bit operating mode to obtain a maximum value (i.e., 7FFFFFh in 24-bit operating mode, or 007FFFh in 16-bit operating mode) or a minimum value (i.e., 800000h in 24-bit operating mode, or FF8000h in 16-bit operating mode).

The multiplexer 136 performs data alignment functions. The multiplexer 136 transfers the 48-bit data of the saturation register 132 to the 48-bit product register 138 in a 24-bit multiply mode of operation. In a 24-bit PH write mode, the multiplexer 136 selects 24-bit data provided from data bus 32 or 34 via a data buffer 134, and writes the data into 24 high-order bits PH of the product register 138. In this case, 24 low-order bits PL of the product register 138 is written with zeros. In a 16-bit PH write mode, the multiplexer 136 selects 16-bit data from data bus 32 or 34, and stores the 16-bit data in the 16 least significant bits of the PH position of the product register 138. In this mode, zeros are written into the 8 most significant bits of the PH position and the 24-bit PL position.

In a 24-bit PL write mode, the multiplexer 136 selects 24-bit data from data bus 32 or 34, and transfers the 24-bit data to the 24-bit PL position of the product register 138. In this mode, the content of the 24-bit PH position of the product register 138 is unchanged. In a 16-bit PL write mode, the multiplexer 136 selects 16-bit data from data bus 32 or 34, and writes the 16-bit data into the 16 most significant bits of the PL position of the register 130. In this mode, the content of the 24-bit PH position of the register 138 is unchanged, and zeros are written into the 8 least significant bits of the PL position of the register 138.

In a 24-bit PH read mode, 24-bit data in the PH position of the product register 138 is provided to data bus 32 or 34. In a 16-bit PH read mode, 16-bit data in the 16 least significant bits of the PH position of the register 138 is provided to the 16 least significant bits of data bus 32 or 34. In a 24-bit PL read mode, 24-bit data in the PL position of the register 138 is provided to data bus 32 or 34. In a 16-bit PL read mode, 16-bit data in the 16 most significant bits of the PL position of the register 138 is provided to the 16 least significant bits of data bus 32 or 34.

As described above, in the 16-bit mode, the M-MAC unit 64a needs to align data once only when 32-bit data of the multiplier 126 is provided to the temporary register 128. At that time, the M-MAC unit 64a aligns the data in bits 8 to 39 of the temporary register 128.

Figure 6:
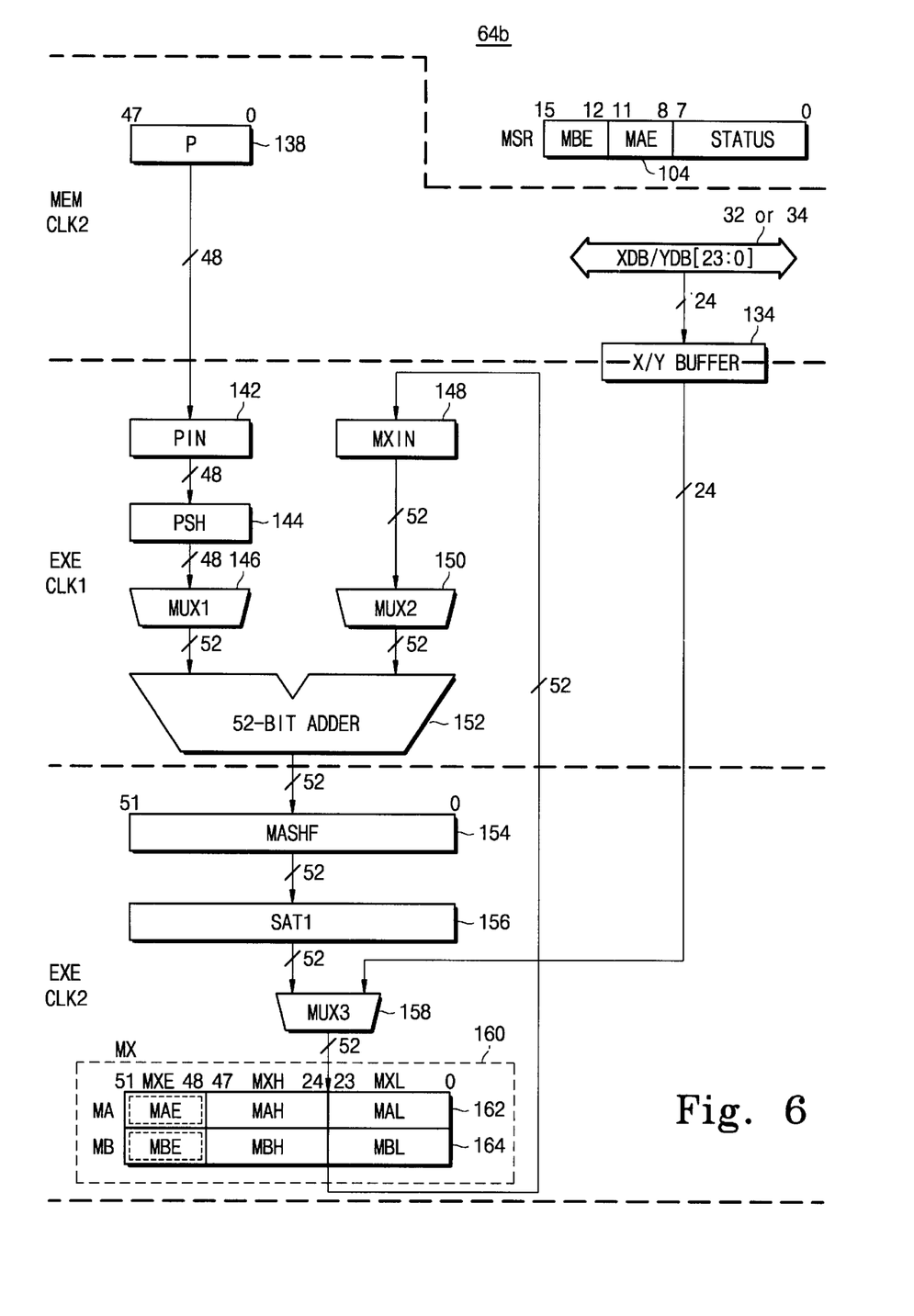
FIG. 6 is a block diagram illustrating an accumulate portion of the multiply and accumulate unit shown in FIG. 3.

FIG. 6 illustrates an accumulate circuit portion 64b of the MAC unit 64 shown in FIG. 3. The accumulate circuit portion 64b of the MAC unit 64 (hereinafter, referred to as "A-MAC" unit) performs arithmetic addition and arithmetic subtraction for an accumulated result in MAC operations. The A-MAC unit 64b performs both 24-bit arithmetic and 24-bit logical operations and 16-bit arithmetic and 16-bit logical operations using the same hardware. Shifting operations are performed on operands of the operations to allow the 16-bit arithmetic and 16-bit logical operations. In a logical shift, an operand is shifted to left or right by n bits, and zeros are transferred into the n vacated positions. In an arithmetic shift, the shifted operand is treated as a signed 2's complement number. An arithmetic shift to left by one bit is equivalent to a multiplication by 2, and an arithmetic shift to right by one bit is equivalent to a division by 2. The arithmetic shift to right extends the sign bit to the right for the number of bits shifted. The arithmetic shift to left is basically the same as the logical shift to left.

With continuing reference to FIG. 6, the A-MAC unit 64b is pipelined, and every accumulate operation (i.e., addition or subtraction) is performed in one external clock cycle (i.e., two internal clock cycles). The A-MAC unit 64b includes two input registers 142 and 148 labeled PIN and MXIN respectively, two shifters 144 and 154 labeled PSH and MASHF respectively, three multiplexers 146, 150 and 158 labeled MUX1, MUX2 and MUX3 respectively, a 52-bit adder 152, a 52-bit saturation register 156 labeled SAT1, and a 52-bit accumulator 160 labeled MX, all of which operate for the EXE stage of pipeline. The input registers 142 and 148, the shifter 144, the multiplexers 146 and 150, and the adder 152 are synchronized with the first internal clock signal CLK1. The shifter 154, the saturation register 156, the multiplexer 158, the accumulator 160, and the status register 104 are synchronized with the second internal clock CLK2. A conversion between the 24-bit mode and the 16-bit mode is performed either by changing a status bit in the status register 104 or in response to a mode conversion command.

A 48-bit product stored in the product register 138 of the M-MAC unit 64a is provided to the shifter 144 through the input register 142. A content of the shifter 144 is shifted by 24 bits to the right in a double precision data format in which two data words are used to represent a resultant product value. In a restore mode, the shifter 144 shifts its content by 1 bit to the left. The multiplexer 146 provides a 52-bit output. The multiplexer 146 selects one of unshifted content of the shifter 144 (i.e., a content of the input register 142), a complement of the unshifted content of the shifter 144, and the shifted content of the shifter 144. The multiplexer 146 can also provide 48 zeros to the 52-bit adder 152, if necessary.

The input register 148 receives 52-bit data from the accumulator 160 and transfers the data to the multiplexer 150. When the adder 152 requires a product result of the M-MAC unit 64a alone, for example, in an initial accumulate operation, the multiplexer 150 provides 52 zeros to the adder 152. Otherwise, the multiplexer 150 transmits a content of the input register 148 to the adder 152, so that a product from the M-MAC unit 64a is added to a third operand stored in the accumulator 160. As shown in FIG. 6, the accumulator 160 is constructed with two accumulate registers 162 and 164 labeled MA and MB, respectively. A product from the M-MAC unit 64a is added to a third operand, i.e., a content of one of the accumulate registers 162 and 164. The result of the addition in the adder 152 is written back into the same accumulator register 162 or 164. Before the addition, a 4-bit extension of the product is performed by the multiplexer 146, so that a 48b it -product from M-MAC unit 64a is converted into a 52-bit product with four extension bits.

The shifter 154 performs a 1-bit arithmetic shift-to-left operation for a result of the addition excluding carries, a 1-bit arithmetic shift-to-right operation for the addition result excluding carries, or a 1-bit arithmetic shift-to-left operation for the addition result including carries. When an overflow/underflow occurs, the saturation register 156 performs a 52-bit saturation operation in a 24-bit mode to obtain its maximum/minimum value. In contrast, the saturation register 156 performs a 44-bit saturation operation in a 16-bit mode. This will be described later in detail. The status register 104 stores status data, such as sign, carry, overflow, underflow, zero and other flags in its status bit position STATUS in accordance with an addition or a subtraction. The status register 104 may have, for example, two 8-bit registers.

The multiplexer 158 functions as a data aligner. The multiplexer 158 transfers the 52-bit data of the saturation register 156 to one of the accumulate registers 162 and 164 in a 24-bit multiply mode of operation. In a 24-bit MXH write mode, the multiplexer 158 selects 24-bit data provided from data bus 32 or 34 via a data buffer 134, and writes the 24-bit data into 24 high-order bits MXH of the accumulator 160 (i.e., 24-bit high-order bits MAH of the accumulate register 162 or 24-bit high-order bits MBH of the accumulate register 164). In this case, 24 low-order bits MXL of the accumulator 160 (i.e., 24-bit low-order bits MAL of the accumulate register 162 or 24-bit low-order bits MBL of the accumulate register 164) is written with zeros, and 4 guard bits MXE (i.e., 4 guard bits MAE of the register 162 or 4 guard bits MBE of the register 164) are written with sign bits. In an alternative embodiment, the accumulate registers 162 and 164 may be 48-bit and the guard bits MAE and MBE may be included in the status register 104 in the 24-bit mode. In this case, when a content of the guard bits is necessary, the status register 104 is accessed instead of the accumulate registers 162 and 164. Also, in a 16-bit mode, the guard bits MAE and MBE may be implemented in the bits 40 to 47 of the accumulate registers 162 and 164.

In a 16-bit MXH write mode, the multiplexer 158 selects 16-bit data from data bus 32 or 34, and stores the 16-bit data in the 16 least significant bits of the MXH position of the accumulator 160. In this mode, zeros are written into the 8 most significant bits of the MXH position and the 24 bits of the MXL position. In a 24-bit MXL write mode, the multiplexer 158 selects 24-bit data from data bus 32 or 34, and transfers the 24-bit data to the low-order data bit position MXL of the accumulator 160. In this mode, the 28 high-order bits (i.e.,the MXH and MXE bits) of the accumulator 160 are unchanged. In a 16-bit MXL write mode, the multiplexer 158 selects 16-bit data from data bus 32 or 34, and writes the 16-bit data into the 16 most significant bits of the MXL position of the accumulator 160. In this mode, there is no change in the 28 higher-order bits of the accumulator 160, and zeros are written into the 8 least significant bits of the MXL position of the accumulator 160.

In a 24-bit MXH read mode, 24-bit data in the MXH position of the accumulate register 162 or 164 is provided to data bus 32 or 34. In a 16-bit MXH read mode, 16-bit data in the 16 least significant bits of the MXH position of the accumulate register 162 or 164 is provided to the 16 least significant bits of data bus 32 or 34. In a 24-bit MXL read mode, 24-bit data in the MXL position of the accumulate register 162 or 164 is provided to data bus 32 or 34. In a 16-bit MXL read mode, 16-bit data in the 16 most significant bits of the MXL position of the accumulate register 162 or 164 is provided to the 16 least significant bits of data bus 32 or 34.

As described above, the A-MAC unit 64b needs to align data only in the 16-bit MXL read or write mode. Accordingly, the A-MAC unit 64b of the invention has an enhanced computation speed over a conventional DSP requiring to perform an alignment of data for every register access in a 16-bit mode of operation.

Figure 7:
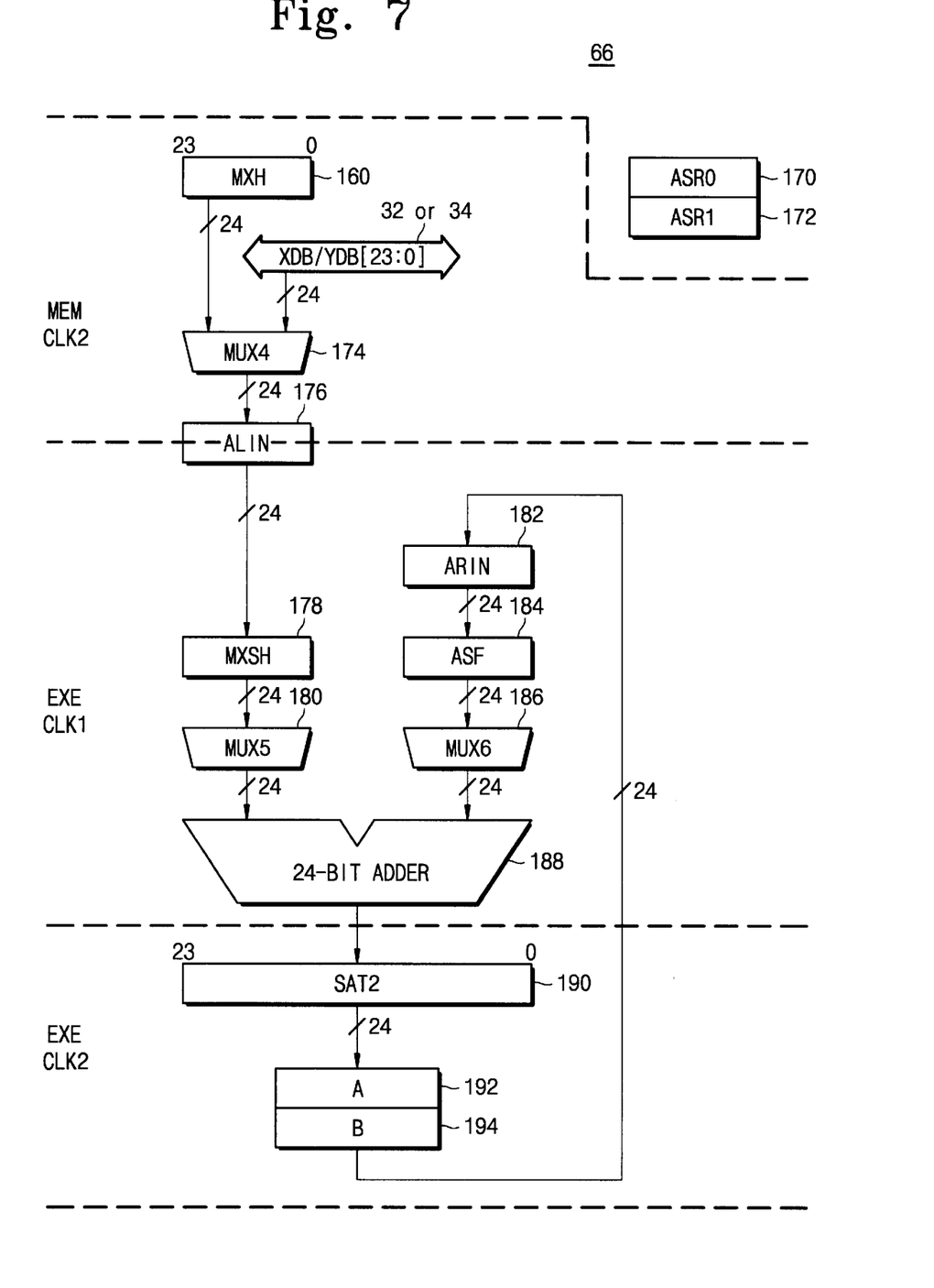
FIG. 7 is a block diagram illustrating an embodiment of the arithmetic unit shown in FIG. 3.

FIG. 7 is a block diagram illustrating an embodiment of the arithmetic unit 66 shown in FIG. 3. The arithmetic unit 66 performs all the arithmetic operations such as addition, subtraction, comparison, increment, decrement, bit-field manipulation, and the like, except multiplication that is accomplished by the MAC unit 64. Referring to FIG. 7, the arithmetic unit 66 includes two status registers 170 and 172 labeled ASR0 and ASR1 respectively, three multiplexer 174, 180 and 186 labeled MUX4, MUX5 and MUX6 respectively, two input registers 176 and 182 labeled ALIN and ARIN respectively, two shifters 178 and 184 labeled MXSH and ASF respectively, a 24-bit adder 188, a 24-bit saturation register 190 labeled SAT2, and two arithmetic result registers 192 and 194 labeled A and B, respectively.

The arithmetic unit 66 has a set of instructions for conversion from 16-bit data into 24-bit data, or vice versa. With a bit conversion instruction, the arithmetic unit 66 scales up 16-bit data to 24-bit data by shifting the 16-bit data to the left by 8 bits, or the arithmetic unit 66 scales down 24-bit data to 16-bit data by shifting the 24-bit data to the right by 8 bits.

The multiplexer 174 receives 24-bit data from either 24 high-order bits MXH of the accumulator 160 (i.e., 24 high-order bits MAH of the register 162 or 24 high-order bits MBH of the register 164) or the data bus 32 or 34. The data received in the multiplexer 174 is transmitted through the input register 176 to the shifter 178. The input register 182 receives 24-bit data stored in either of the arithmetic result registers 192 and 194, and then transmits the data to the shifter 184.

The shifter 178 shifts the data from the input register 176 to the right or left by 1 bit if necessary, and otherwise passes the data to the multiplexer 180. The shifter 184 shifts the data from the input register 182 to the right or left by 1 bit or 8 bits if necessary. The shifter 184 also performs logical shift operations for the data together with carries if necessary. Otherwise, the shifter 184 passes the data from the input register 182 to the multiplexer 186.

The multiplexer 180 provides a content of the shifter 178 or its complement to the adder 188. Also, the multiplexer 180 can provide a specific value (such as 0 or −1) to the adder 188, if necessary, regardless of the content of the shifter 178. The multiplexer 186 provides a content of the shifter 184 or its complement to the adder 188. The multiplexer 186 can also pass a particular bit or bits (such as a sign bit, 8 or 16 least significant bits) of the shifter 186 to the adder 188 selectively. In addition, the multiplexer 186 can provide a specific value (such as 0) to the adder 188 regardless of the content of the shifter 184.

The adder 188 adds two inputs supplied from the multiplexers 180 and 186 to obtain a certain arithmetic result, and the result of the addition is written back into the register 192 or 194 through the saturation register 190 which performs a 24-bit saturation operation when an overflow or underflow takes place. When the arithmetic result overflows or underflows in 24-bit mode, the saturation register 190 saturates the result of the addition to a maximum value (7FFFFFh) or a minimum value (800000h) of 24 bits. Since the overflow/underflow is prevented during the arithmetic operation as mentioned above, a data transfer operation from the arithmetic result register 192 or 194 to data bus 32 or 34 requires no saturation operation. In 16-bit mode, no overflow/underflow occurs because the 8 most significant bits of the registers 192 and 194 are used as guard registers for overflow/underflow protection. But, in this case, if the arithmetic result exceeds 16 bits, then a data transfer operation from the arithmetic result register 192 or 194 to data bus 32 or 34 needs a saturation operation.

Figure 8:
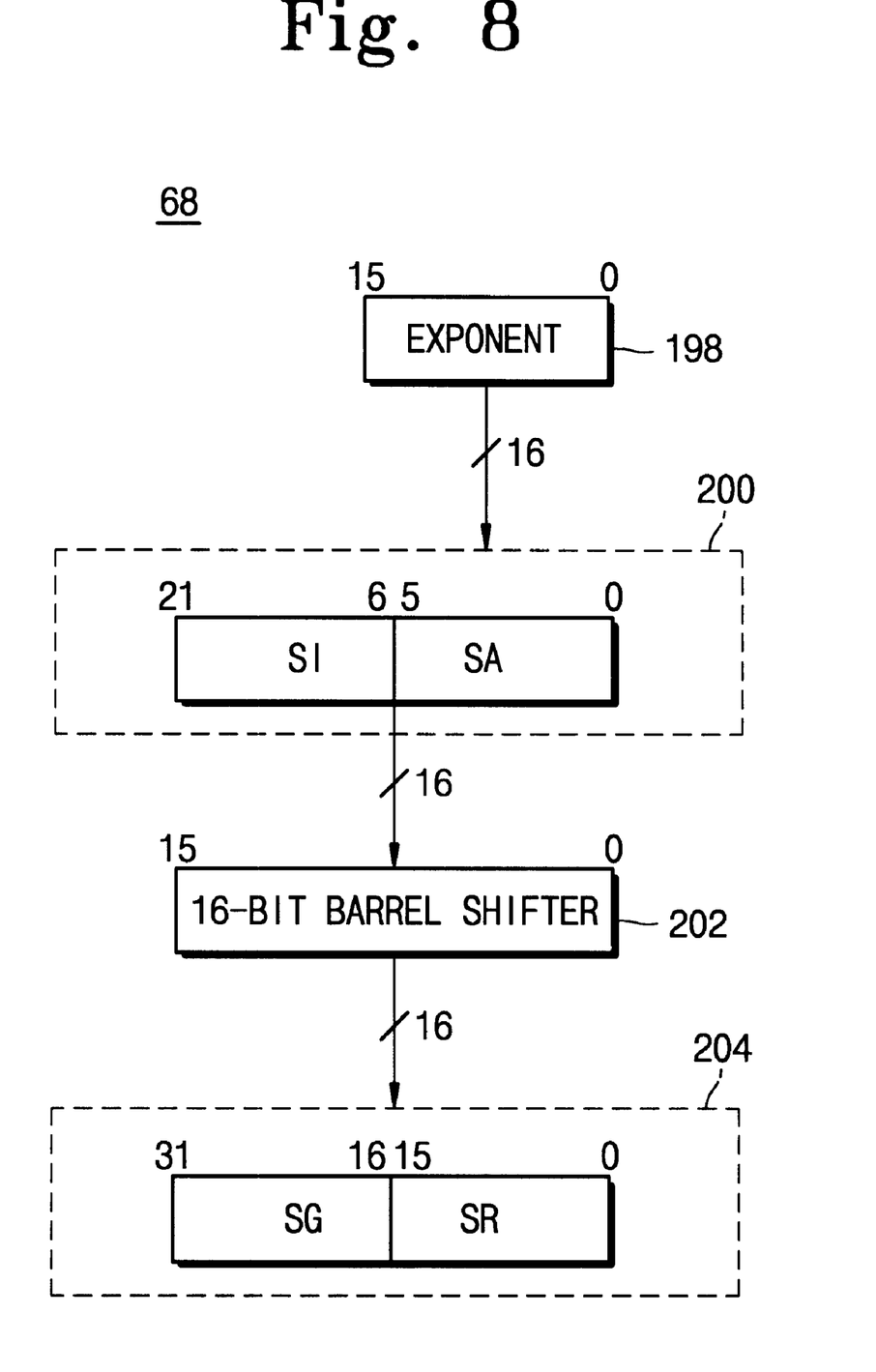
FIG. 8 is a block diagram illustrating an embodiment of the shift and exponent unit shown in FIG. 3.

FIG. 8 illustrates an embodiment of the shift and exponent (SE) unit 68 of FIG. 3. With reference to FIG. 8, the SE unit 68 comprises a 16-bit exponent register 198, a 21-bit input register 200, a 16-bit barrel shifter 202, and a 32-bit output register 204. The exponent register 198 evaluates an exponent. The input register 202 includes two operand fields specified for a shift instruction: a 16-bit input field SI and a 6-bit shift amount field SA. The SI field specifies the operand to be shifted, and the SA field specifies the number of bits to be shifted. The barrel shifter 202 permits fast shifts by a specified number of bits (up to 16 bits) at a time. The output register 204 stores a content of the barrel shifter 202.

Figure 9:
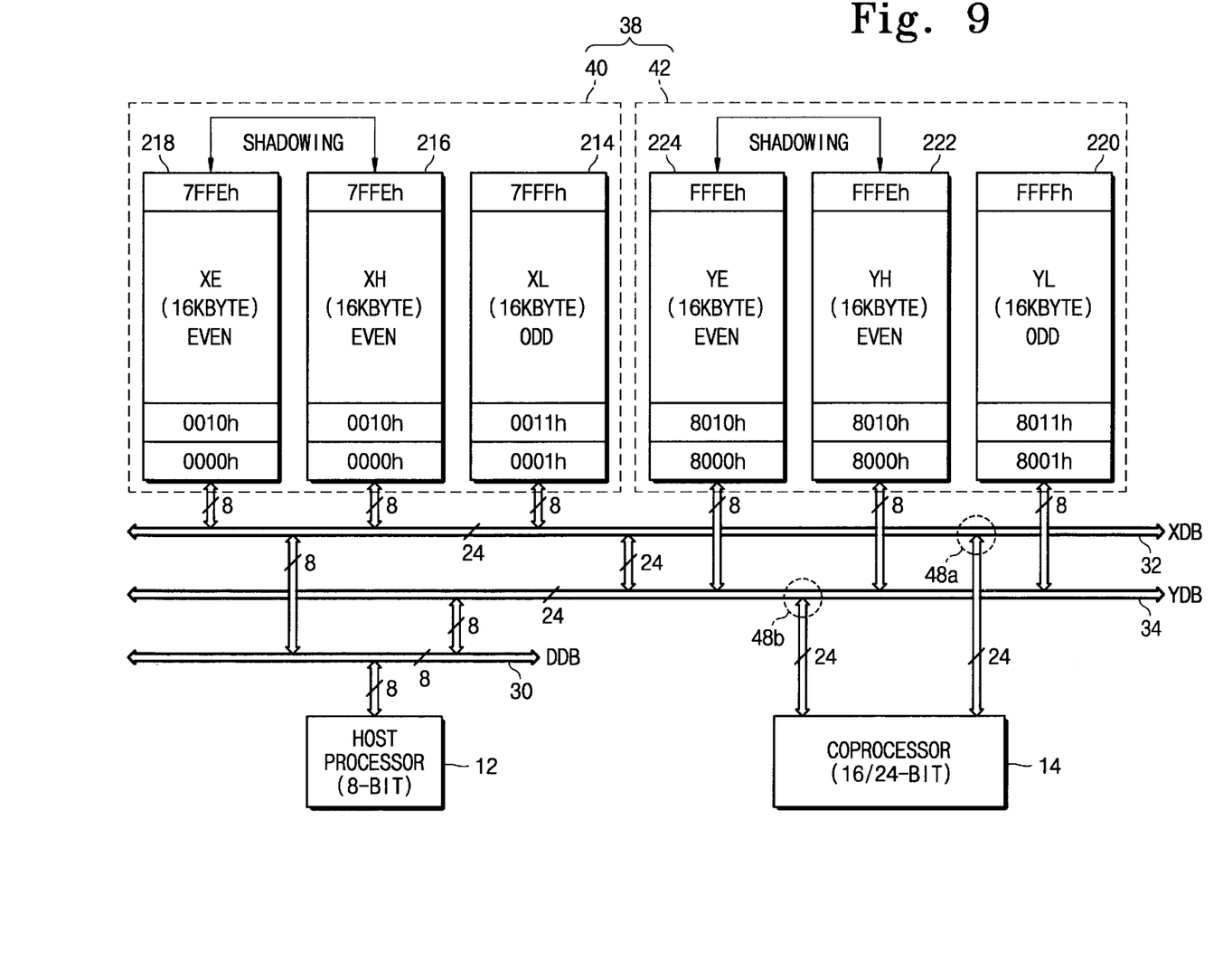
FIG. 9 is a schematic view illustrating an architecture of the data memory shown in FIG. 1.

FIG. 9 illustrates an architecture of the data memory 38 shown in FIG. 1. As noted previously, the host processor 12 is an 8-bit processor and the DSP coprocessor 14 is a 24-bit processor. The host processor 12 therefore processes information by 8 bits (1 byte) and requires an 8-bit wide data bus 30 for accessing the data memory 38. Likewise, the DSP 14 processes information by 24 bits (3 bytes) and requires 24-bit wide data buses 32 and 34 for accessing the data memory 38. It is therefore necessary for the DSP 14 to align its data into 3-byte format. This may lead to complexity in address generator design. To avoid such design complexity, 4-byte (double word) alignment can be adopted. In this case, however, there may be present an unused 1-byte storage per every 4-byte storage of the data memory 38, thereby increasing memory size and cost.

Referring to FIG. 9, the 64-Kbyte data memory 38 is divided into two 32-Kbyte data memory banks 40 and 42. This is because a MAC operation typically permits two data operands to be fetched simultaneously in a single cycle. In this case, the DSP 14 accesses the X memory bank 40 for one operand and the Y memory bank 42 for the other operand. Each 32-Kbyte memory bank 40 or 42 is subdivided into two 16-Kbyte (2 Kbytes×8 bits) blocks 214, 216 labeled XL and XH, respectively, or 220, 222 labeled YL and YH, respectively. As shown in FIG. 9, all the memory locations of the memory blocks 214 and 220 have odd addresses, and all the memory locations of the memory locations of the memory blocks 216 and 222 have even addresses. The memory blocks 216 and 214 are mapped to the address range of '0000h' to '7FFFh'. The memory blocks 222 and 220 are mapped to the address range of '8000h' to 'FFFFh'.

The host processor 12 has 8-bit random accesses to the individual memory blocks 214, 216, 220 and 222, by generating a 16-bit address. The DSP 14 has, in a 16-bit mode, 16-bit random access to each data memory bank 40 or 42, i.e., each pair of memory blocks 214 and 216, or 220 and 222, using a 15-bit address.

The data memory 38 further includes two shadow memory blocks 218 and 224 labeled XE and YE, respectively. The two shadow memory blocks 218 and 224 are allocated to the two memory banks 40 and 42, respectively. These shadow memory blocks 218 and 224 provide for the 24-bit mode of the DSP 14. All the memory locations of the shadow memory block 218 are allocated by the same addresses as the memory block 216. Likewise, all the memory locations of the shadow memory block 224 are allocated by the same addresses as the memory block 222.

From the viewpoint of the host processor 12, the shadow memory blocks 218 and 224 have the same memory map as the memory blocks 216 and 222, respectively. In other words, when the host processor 12 accesses the data memory 38 using an even address, the host processor 12 selects one of the two memory blocks 216 and 218, or one of the two memory blocks 222 and 224 in accordance with a current system status. That is, one of two memory blocks 216 and 218, or 222 and 224 can be accessed by the host processor 12 and the other is shadowed by the selected one.

With this memory architecture, the DSP 14 may have, in its 24-bit mode, 24-bit random accesses to the data memory bank 40 including the memory blocks 214, 216 and 218, or to the data memory bank 42 including the memory blocks 220, 222 and 224, by generating the same15-bit address as its 16-bit mode. The bus data aligners 48a and 48b align the data on the data buses 32 and 34 by a word (i.e., 16 bits) in both the 16-bit mode and 24-bit mode in response to the DSP 14.

The shadow memory blocks 218 and 224 are to store 24-bit wide data, such as audio data, which is usually a portion of the entire data stored in the data memory 38, so that each shadow memory block 218 or 224 can have a size smaller than 16 Kbytes. Such features of the shadow memory blocks 218 and 224 maximize the efficiency in the use of the data memory. Further, since such a memory architecture allows the DSP 14 to use the same 15-bit address in the 24-bit mode as in the 16-bit mode, it is possible to simplify the configuration of the address generator therein, i.e., the RAM pointer 62 (see FIG. 1).

In the drawings and the specification, there have been disclosed preferred embodiments of the invention. Although specific terms are employed, they are used in a generic and descriptive sense only and not for purposes of limitation. The scope of the invention is set forth in the following claims.

What is claimed is:

1. An apparatus for performing arithmetic operations in a data processing system, the apparatus comprising:

a first M-bit register for storing a first N-bit operand, where M and N are integers and M is larger than N;

a second M-bit register for storing a second N-bit operand;

a first shifter for shifting the first N-bit operand;

a second shifter for shifting the second N-bit operand;

a first execution unit, coupled to the first and second M-bit registers, for performing a first arithmetic operation on the first and second N-bit operands to obtain a 2N-bit result; and a 2M-bit register, coupled to the first execution unit, for storing the 2N-bit result;

wherein N high-order bits of the 2N-bit result are stored in N least significant bits of M high-order bits of the 2M-bit register, and N low-order bits of the 2N-bit result are stored in N most significant bits of M low-order bits of the 2M-bit register.

2. The apparatus of claim 1, further comprising:

an extension unit, coupled to the 2M-bit register, for extending a content of the 2M-bit register to P bits, where P is an integer and P is larger than the 2N; and a second execution unit, coupled to the extension unit, for performing a second arithmetic operation on the extended P bits and a third operand to obtain a P-bit result.

3. The apparatus of claim 2, wherein the first execution unit multiplies the first and second N-bit operands, and the second execution unit adds the extended P bits and the third operand to obtain the P-bit result.

4. The apparatus of claim 2, further comprising a P-bit register, coupled to the second execution unit, for storing the P-bit result, wherein the P-bit register includes guard bits for preventing overflow and underflow.

5. The apparatus of claim 2, further comprising a status register for storing status data including at least one of sign, carry, overflow, underflow, zero, and other flags.

6. The apparatus of claim 2, further comprising a second P-bit register, coupled to the second execution unit, for storing the P-bit result.

7. The apparatus of claim 5, wherein the apparatus has a 16-bit operating mode and a 24-bit operating mode, and a conversion between the 16-bit operating mode and the 24-bit operating mode is performed in response to one of a mode conversion command and a change of the status date in the status register.

8. The apparatus of claim 7, wherein the status register includes guard bits for preventing overflow and underflow in the 24-bit operating mode.

9. The apparatus of claim 7, wherein the second P-bit register includes guard bits for preventing overflow and underflow in the 16-bit operating mode.

10. A method for performing a multiply and accumulate operation in a M-bit data processing system, the method comprising:

allowing the M-bit data processing system to enter one of an M-bit operating mode and an N-bit operating mode, where M and N are integers, and M is larger than N;

providing a first N-bit operand to a first M-bit register in the N-bit operating mode;

providing a second N-bit operand to a second M-bit register in the N-bit operating mode;

shifting the first N-bit operand;

shifting the second N-bit operand;

performing a first arithmetic operation on the first and second N-bit operands to obtain a 2N-bit result; and storing the 2N-bit result in a 2M-bit register;

wherein N high-order bits of the 2N-bit result are aligned in N least significant bits of M high-order bits of the 2M-bit register and N low-order bits of the 2N-bit result are aligned in N most significant bits of M low-order bits of the 2M-bit register.

11. The method of claim 10, further comprising:

extending a content of the 2M-bit register to P bits, where P is an integer and P is larger than the 2N; and performing a second arithmetic operation on the extended P bits and a third operand to obtain a P-bit result.

12. The method of claim 11, wherein the step of performing a first arithmetic operation includes multiplying the first and second N-bit operands, and the step of performing a second arithmetic operation includes adding the extended P-bits and the third operand to obtain the P-bit result.

13. The method of claim 12, wherein the M is equal to 24 and the N is equal to 16.

14. The method of claim 10, wherein the step of allowing includes performing mode conversions between the M-bit operating mode and the N-bit operating mode in response to one of a mode conversion command and a change of status data.

* * * * *